United States Patent [19]
Kelly et al.

[11] Patent Number: 4,641,372
[45] Date of Patent: Feb. 3, 1987

[54] POWER FEEDING SUBMARINE TELECOMMUNICATIONS SYSTEMS

[75] Inventors: Patrick S. Kelly, London; Thomas Oswald; Alan J. Jeal, both of Dartford; Stephen E. Hill, South Darewth; Robert Murphy, Sevenoaks, all of England

[73] Assignee: STC PLC, London, England

[21] Appl. No.: 652,467

[22] Filed: Sep. 20, 1984

[30] Foreign Application Priority Data

Sep. 22, 1983 [GB] United Kingdom ............... 8325430

[51] Int. Cl.⁴ .................................. H04B 9/00
[52] U.S. Cl. ...................... 455/601; 370/16; 307/53; 307/64; 307/69; 375/4
[58] Field of Search ................ 455/601, 612; 179/170 J, 175.35; 307/44, 51, 52, 53, 55, 57, 64, 65, 69, 70; 375/3, 4

[56] References Cited

U.S. PATENT DOCUMENTS 3,644,787  2/1972  Hamilton ................... 179/170 J

FOREIGN PATENT DOCUMENTS 2115172  9/1983  United Kingdom .

*Primary Examiner*—Joseph A. Orsino, Jr.
*Attorney, Agent, or Firm*—Kerkam, Stowell, Kondracki & Clarke

[57] ABSTRACT

An optical undersea telecommunications system has a main cable (1) which branches (BU1) near a landfall to two separate stations. Each branch (71,81) supplies half the current of the main cable (1) for powering the regenerators. In the event of a fault in a branch (e.g. 81) caused by an anchor or fishing gear, the operational branch (71) regenerator (e.g 11) can supply the full current (I) via a zener diode power feed and bypass circuit and high voltage diodes (D1,D2) automatically prevent leakage of current back to the fault.

10 Claims, 8 Drawing Figures

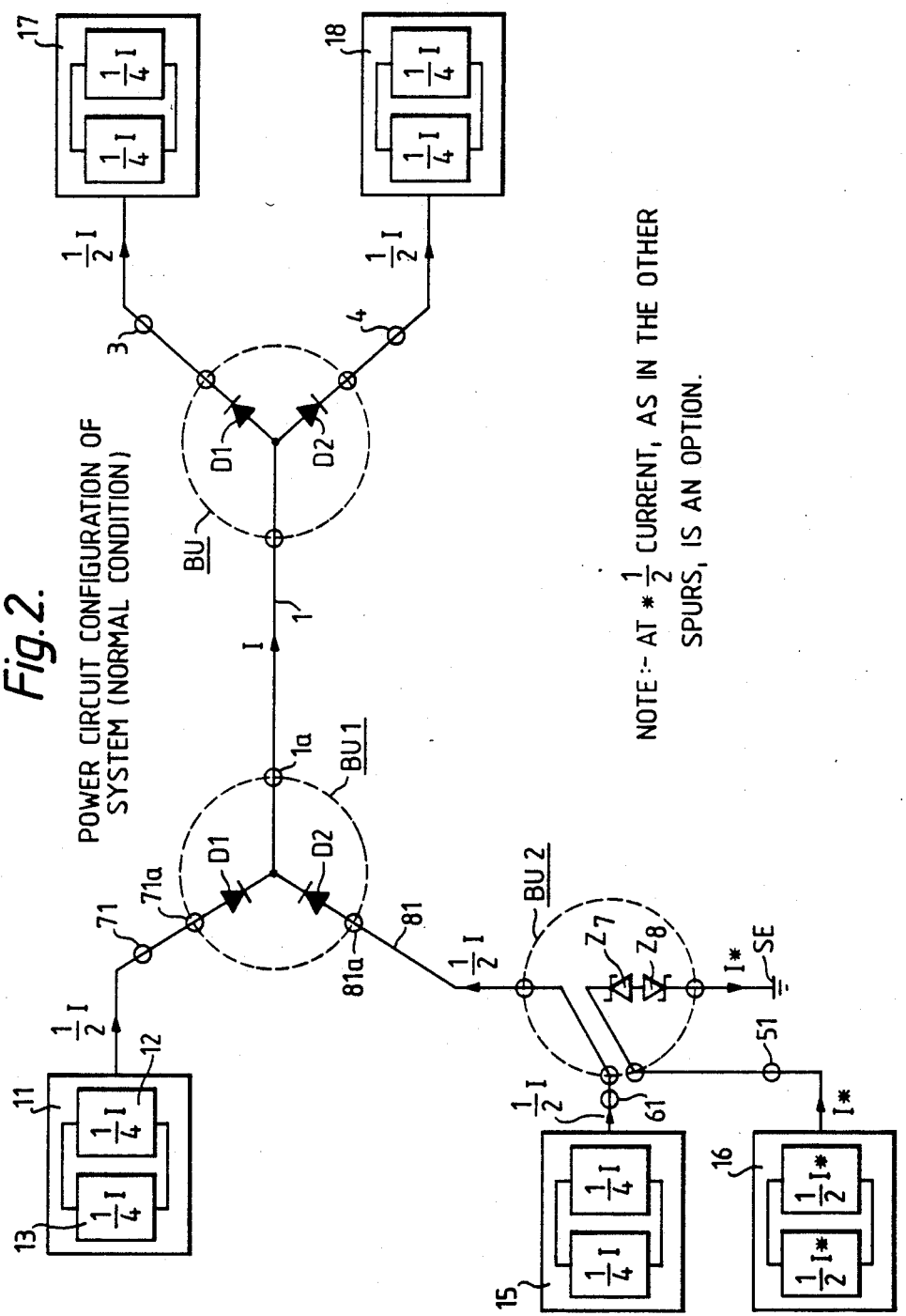

4,641,372

POWER FEEDING SUBMARINE TELECOMMUNICATIONS SYSTEMS

FIELD OF THE INVENTION

This invention relates to power feeding submarine telecommunications systems, particularly to such systems in which a main route branches into two separate routes when approaching a landfall.

BACKGROUND OF THE INVENTION

In some circumstances it is desirable to have more than one land station in, for example, a transatlantic telecommunication system between the USA on the one hand and Europe on the other hand. Thus both the UK and France may be connected to the same transatlantic cable. This would have two advantages. Firstly it would enable the transatlantic cable to be kept fully occupied during slack periods of either the French or UK traffic by routing traffic of the busier country through the other country to the cable rather than hold up some of the busier traffic. Secondly should a fault occur in one branch the other branch would still be able to handle the traffic of both the UK and France.

SUMMARY OF THE INVENTION

According to the present invention there is provided a telecommunications system having a main cable which branches to two separate branch cables towards one end of the system, wherein the main cable and at least one of the branch cables has a signal regenerator, characterised in that:- electrical current for powering a main path regenerator is fed via both branch cables during normal operation and in the event of a fault in a branch cable, the other branch cable current can be increased to fulfill the main cable current requirement via a branch regenerator incorporating a current bypass circuit to automatically bypass the extra current required, and in that means are provided to prevent current flowing back to earth at the fault.

According to another aspect of the present invention there is provided a main cable regenerator for a digital signal transmission system as described in the preceding paragraph, characterised in that the regenerator comprises a power feeding arrangement for feeding in parallel a regenerator circuit for a first transmission path in the cable, and a regenerator circuit for a second transmission path in the cable, the power feeding arrangement being effective to carry the increase in current necessary under fault conditions.

According to yet another aspect of the present invention there is provided a branch cable regenerator for a digital signal transmission system as described in the preceding paragraph but one, the branch regenerator comprising a first power feeding arrangement for a regenerator circuit for a first transmission path in the branch cable, a second power feeding arrangement for a regenerator circuit for a second transmission path in the branch cable, said power feeding arrangements being connected in series and effective to carry the increase in current necessary under fault conditions.

According to a further aspect of the invention there is provided a branching unit for the system characterised by comprising a main cable port, a first branch cable port and a second branch cable port, and for each branch cable a high voltage unidirectional device arranged to prevent back current leakage to earth at a fault encountered by a branch cable during operation.

In order that the invention can be more clearly understood reference will now be made to the accompanying drawings in which:

BRIEF DESCRIPTION OF THE DRAWINGS

FIG. 2 shows the power circuit configuration for one of the systems of FIG. 1;

DESCRIPTION OF THE PREFERRED EMBODIMENTS

Figure 1A:
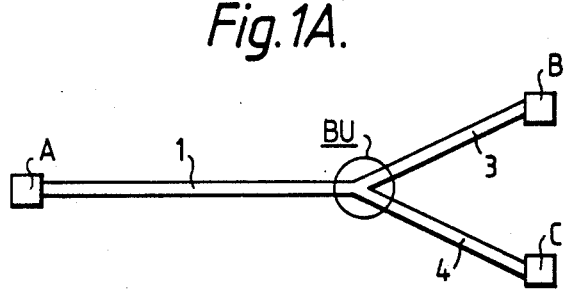
FIGS. 1A to 1E show a number of digital submarine system configurations each according to an embodiment of the present invention.

FIG. 1 shows some route options which can be considered for digital optical submarine systems. In all of these except FIG. 1E each of the separate parts of the route contain two optical fibre pairs. In the FIG. 1A configuration there is shown an optical fibre submarine system having a main path 1 extending between a land terminal station A to a branching unit BU from where two branches or spurs 3 and 4 extend to respective land terminal stations B and C. The branching unit BU is located in deep water in comparison with the spurs 3 and 4 and is very unlikely to be disturbed.

In the other FIGS. 1B to 1F like reference numerals indicate like parts of the system.

Figure 1B:
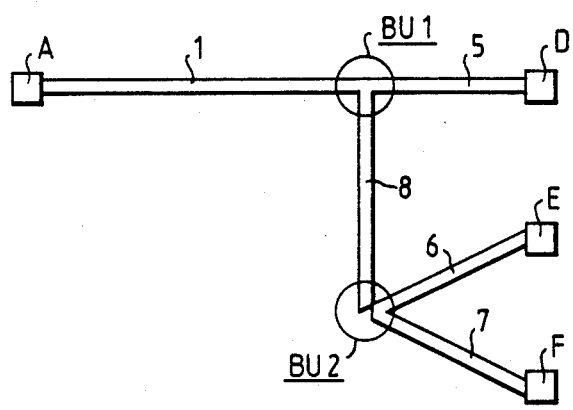

In FIG. 1B there are two branching units, BU1, BU2 feeding three land terminal stations D, E, and F. Stations D and E have direct access to the main path 1 via branches 5, and 6 and 8, respectively, whereas stations F has indirect access via station D and branches 7, 8 and 5, and via station E and branches 7, 6 and 8.

Figure 1C:
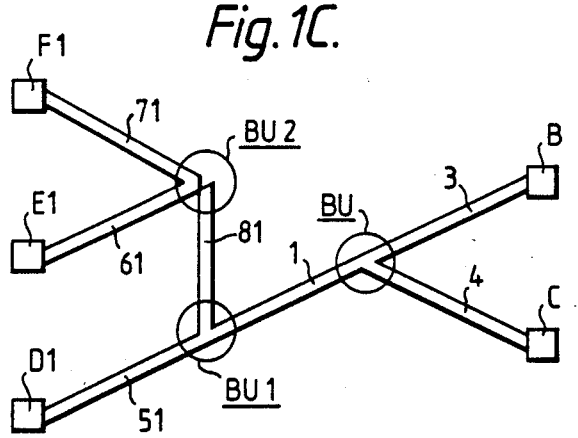

FIG. 1C has three stations D, E and F at one end connected to the main path 1 as described with reference to FIG. 1B, and two stations B and C at the other end connected as described with reference to FIG. 1A.

Figure 1D:
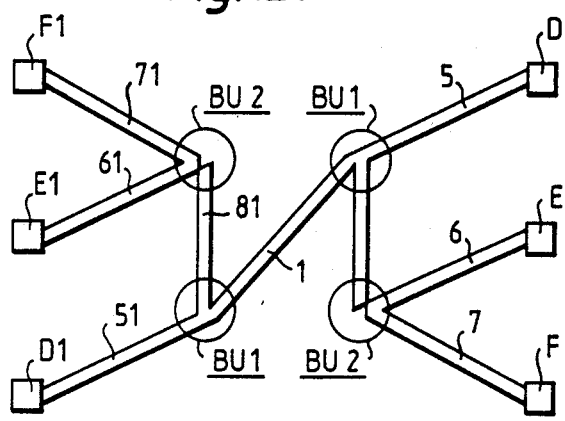

In FIG. 1D there is shown an arrangement in which each end of the main path 1 has three branches. The left hand branching arrangement being similar to that described with reference to FIG. 1B and the right hand branching being similar to that described with reference to FIG. 1C where terminals D1, E1 and F1 are otherwise similar to terminals D, E and F, respectively.

Figure 1E:
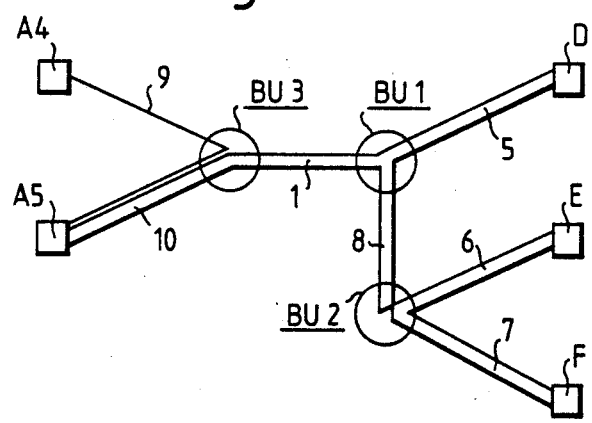

In FIG. 1E the right hand arrangement is similar to that of FIGS. 1B and 1D but the left hand arrangement differs in that terminal A5 has three fibre pairs, two of which connect to the main path 1 via branching unit BU3 and the third provides a single fibre pair link via branches 10 and 9 to terminal A4. Terminal A4 has no direct link with the main path 1, only an indirect one way link via terminal A5.

Each branching unit such as BU, BU1 and BU2 has a main cable port 1a sealed to the main cable 1 and branch cable ports 71a, 81a sealed to respective branch cables and houses directional H.V. diodes D1 and D2.

In the case of a two landing system (on either side of the ocean), i.e. FIG. 1A and FIG. 1C, each station B and C has two routes, one transoceanic and one between stations: if any station feels the need for more transoceanic traffic it may, by arrangement, find more capacity by subtraction from the capacity of the other by the "backhauled pairs" method. In the case of a three landing system, i.e. FIG. 1B, 1C, 1D and 1E, there are not enough fibre pairs to allow the third station to have direct transoceanic access but interchange of traffic between all three stations and across the ocean is afforded by backhauled pairs.

In the described implementation, if any one spur, on either side of the ocean, should fail-whether by failure of the apparatus or by a cable short circuit or open circuit—the unaffected fibres may continue "in traffic" up to and during the repair operations; that is except for a short period when the power feed conductor, on the ocean side of the repair, is exposed to handling by jointing staff on the ship's deck.

FIG. 2 shows the power circuit configuration of a system used to feed a "go and return" pair of regenerators for one fibre pair under normal usage. Thus referring to FIG. 1C a regenerator arrangement 11 is connected in one of the fibre pairs of branch 71. One regenerator 12 is connected to one of the fibres of the pair and the other regenerator 13 is connected to the other fibre of the pair. Similarly each fibre of a pair has a regenerator in each of the other branches, regenerator arrangements 15, 16, 17 and 18 being connected respectively in branches 61, 51, 3 and 4 of FIG. 1C. Further fibre pairs are fed by placing their regenerators in series with the arrangements shown. A salient feature of these arrangements is that regenerator pairs in the spurs are fed with half the current used to feed those in the main path of the transoceanic link.

Thus the current I for powering regenerators (not shown) in the main path 1 comprises 1/2I from branch 71 and 1/2I from branch 61, and likewise divides at BU into 1/2I in branch 3 and 1/2I in branch 4. Each regenerator 12 or 13 for the "go" or "return" path carries a current value 1/4I. Similarly for the outer regenerators.

Although the current I is shown powering regenerator arrangement 16, this could nevertheless be 1/2I as with arrangement 11, 15, 17 and 18. In normal operation, the transoceanic link is fed from two shore stations, at each end of the system, but, if one spur to them fails, the station which retains an ability to feed power across the ocean increases its current to double the normal current, so that transoceanic traffic to the stations having intact spurs is retained.

Figure 3:
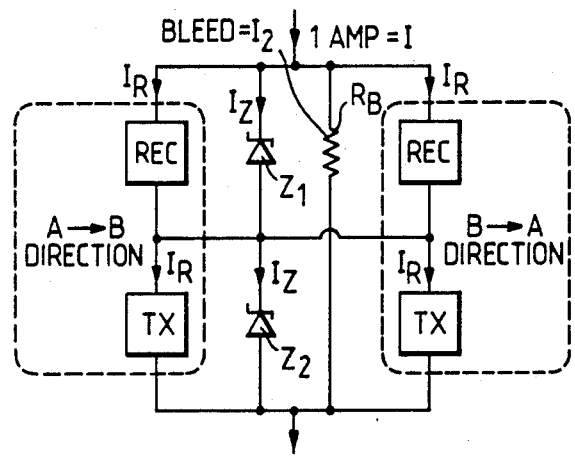
FIG. 3 shows the power circuit configuration for a main path regenerator.
Figure 4:
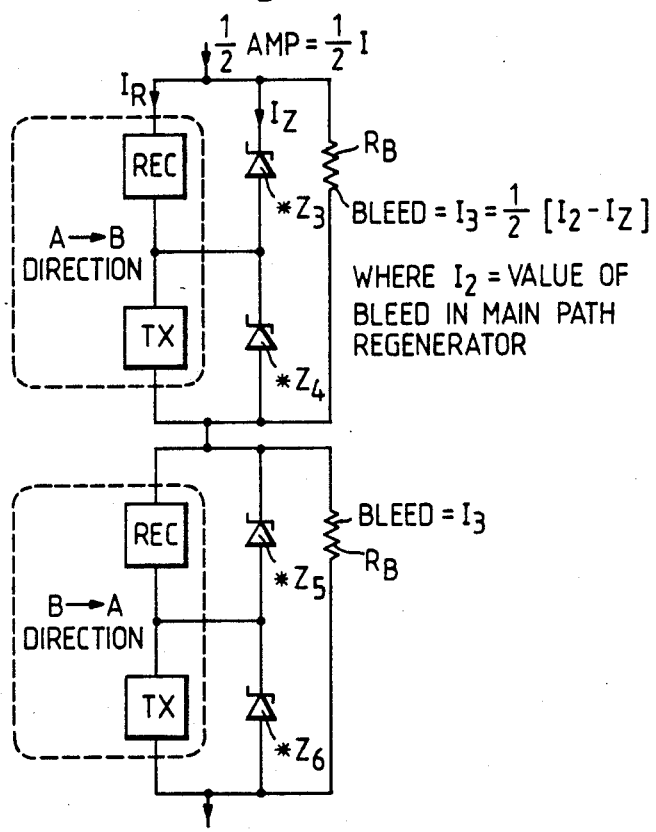
FIG. 4 shows the power circuit configuration of a spur (or branch) regenerator.

FIGS. 3 and 4 show the method by which this is implemented in a main path and spur regenerator respectively. A 3-way split to three terminals at one end of the system, and a 2-way split to two terminals at the other, is depicted as the example such as is shown in FIG. 1C and FIG. 2. A 3-way split requires two 2-way branching units BU1, BU2 in different locations as shown. The main path regenerator has the receive modules REC for each direction in parallel with a common zener diode $Z_1$, and the transmit modules TX for each direction in parallel with a second common zener diode $Z_2$. The zener diodes maintain a desired voltage drop so that each module draws a current $I_R$. A bleed path includes a bleed resistor $R_B$ and draws a current $I_2$. The zener current is identified as $I_Z$. Under fault conditions in a branch then the intact branch would increase its current and the diodes $Z_3$, $Z_4$, $Z_5$ and $Z_6$ have their current increased to $I_Z + I/2$ which in a typical system might mean an increase in the zener current from say 50 mA to something close to 0.7 A.

The branch regenerator (FIG. 4) has four zener diodes $Z_3$, $Z_4$, $Z_5$, $Z_6$ in series, the receive and transmit modules for both directions (A to B and B to A) being connected across respective ones of the zener diodes. Here the feed current is 1/2I. Bleed resistors $R_B$ are connected across the series combination of the transmit and receive modules REC and TX for each direction. The bleed current $I_3$ has the relationship shown in the drawing of FIG. 4.

In the branching units BU and BU1 feeding the transoceanic link (FIG. 2) are two high voltage diodes D1, D2 having a reverse voltage capability equal to the maximum power feed voltage at either end of the system in any configuration. These are connected so that they are in the forward direction for normal current. However, should there be a short circuit to sea at a spur cable, a potential difference arises, between the branch point and the failed spur, which appears across the reverse sense of the diode in that spur.

No current then flows—other than the reverse leakage current of the diode, which can be made very small—from the working system to the failed spur. When a fault occurs, the staff at the station feeding the failed spur informs the staff at the other feeding station that they should increase the feed current to maintain traffic on the transoceanic link.

In the case of the third landing point shown in FIG. 1C and FIG. 2, the additional branching unit BU2 for the third spur is employed. This does not contain HV diodes but it does contain two zener diodes $Z_7$, $Z_8$, back to back. The third spur 51 is fed independently of the rest of the system into a sea earth SE thrown out at the spur; the zener diodes are in series with this sea earth and their function is to isolate the power feed conductor, in the event of a fault on the spur, so that DC or quasi-DC fault location methods can still be employed (in the other branching unit this function is performed by the threshold voltage of the HV diodes). Four cables, two at each end, enter the high pressure bulkheads of this branching unit: they are all of the optical type but one of them the sea earth cable, may or may not contain fibres.

Spare branching units can be used in either of the above cases: they provide 4 entry glands and contain both the HV diodes and the zener diodes mentioned above. Any unused glands are block sealed and unused HV diodes are short circuited. The branching units, in an unused condition are demountable in a manner similar to that employed in ship-board equalisers in analogue coaxial systems. The HV diodes may be left in place at the expense of foregoing quasi-DC fault location measurements on the cable between the branching units.

In the event of a fault on a spur, all repair operations may take place normally. However, when the end of the repair facing the transoceanic link will become exposed before the final joint, there is a risk that this cable-end may be charged to system voltage via the leakage resistance of the HV diodes in the branching units. Then the system should be switched off for a short period to enable the power feed conductor to be earthed, allowing optical splices to proceed. A further removal of power will be required between the beginning and end of the restoration of the polyethylene insulation of the conductor.

The system described uses an optical fibre submarine cable similar to the one described in, for example, British Patent Specification No. 2115172A, the electrical power feeding being carried through the closed "C"-shaped aluminium extrusion and the central fibres carrying the transmission signal.

We claim:

1. A telecommunications system comprising:
   a main cable which branches at a branching unit into two separate branch cables towards one end of the system;
   the main cable and at least one of the branch cables having current-fed signal regenerators;
   the branch cables each including a connection to a current supply source so that, during normal operation, electrical current for supplying a main path regenerator is fed via both branch cables;
   the branch regenerator including a current by-pass circuit to automatically bypass any extra current beyond the requirements of the branch regenerator so that, in the event of a fault in the other one of the branch cables, the current supply to said one of the branch cables can be increased to fulfill the main path regenerator current requirement; and
   said branching unit including means for preventing back current flowing back to earth at the fault.

2. A system as claimed in claim 1 characterised by comprising a branching unit where the main cable branches, the branching unit containing for each branch cable a respective high voltage unidirectional device to prevent back current leakage.

3. A branching unit for a system as claimed in claim 2, comprising a main cable port, a first branch cable port and a second branch cable port, and for each branch cable a high voltage unidirectional device connected to the respective branch cable arranged to prevent back current leakage to earth at a fault encountered by said each branch cable during operation.

4. A system as claimed in claim 1 wherein one of the branch cables has a spur cable extending to a third terminal, the spur cable having a signal regenerator and current for powering the signal regenerator is fed from the third terminal via the spur cable to an earth via the junction of the spur and the branch cables.

5. A system as claimed in claim 1, comprising a first pair of optical transmission paths extending along the main cable and via one branch cable to a first terminal, a second pair of optical transmission paths extending along the main cable and via the second branch cable to a second terminal, and a third pair of optical transmission paths extending along the first and second branch cables via the branching point.

6. A system as claimed in claim 1 wherein the branch cable signal regenerator has a first power feeding arrangement for a regenerator circuit for a first transmission path in the branch cable, and a second power feeding arrangement for a regenerator circuit for a second transmission path in the branch cable, said power feeding arrangements being connected in series.

7. A system as claimed in claim 6, wherein each power feeding arrangement comprises a zener diode arrangement connected electrically in parallel with the regenerator circuit and electrically in series with the cable, and effective to carry the increase in current necessary under fault conditions.

8. A system as claimed in claim 6, wherein the branch and main regenerators each have a current bleed path in parallel with a power feeding arrangement.

9. A system as claimed in claim 1, said a main cable signal regenerator has a power feeding arrangement for feeding in parallel a first transmission path regenerator circuit and a second transmission path regenerator circuit in the main cable.

10. A system as claimed in claim 9, comprising for each transmission path a regenerator circuit respective receive and transmit circuit, there being a first zener diode device connected for power feeding in common the receive circuits and a second zener diode device connected for power feeding in common the transmit circuits, the zener devices being connected in series.

* * * * *